United States Patent
Huang et al.

(10) Patent No.: US 6,951,449 B2
(45) Date of Patent: Oct. 4, 2005

(54) HEAT-DISSIPATING DEVICE

(75) Inventors: Wen-Shi Huang, Taoyuan (TW);
Kuo-Cheng Lin, Taoyuan (TW);
Chen-Chang Lin, Taipei (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 29 days.

(21) Appl. No.: 10/356,593

(22) Filed: Feb. 3, 2003

(65) Prior Publication Data

US 2003/0210992 A1 Nov. 13, 2003

(30) Foreign Application Priority Data

May 7, 2002 (TW) ..................................... 91206376 U

(51) Int. Cl.⁷ .............................................. F04B 39/02
(52) U.S. Cl. ................... 417/368; 417/423.12
(58) Field of Search ................... 417/366, 368, 417/423.4, 423.8, 423.12, 423.14, 350–354; 415/185, 193, 199.4, 199.5; 361/688, 690, 692, 695

(56) References Cited

U.S. PATENT DOCUMENTS

| | | | | | |
|---|---|---|---|---|---|
| 4,111,615 | A | * | 9/1978 | Watanabe | 417/423.2 |
| 4,922,406 | A | * | 5/1990 | Schuh | 360/97.03 |
| 5,967,764 | A | * | 10/1999 | Booth et al. | 417/423.8 |
| 6,318,976 | B1 | * | 11/2001 | Hsieh | 417/423.12 |
| 6,332,758 | B1 | * | 12/2001 | Tang et al. | 417/354 |
| 6,384,494 | B1 | * | 5/2002 | Avidano et al. | 310/58 |
| 6,682,320 | B2 | * | 1/2004 | Gold et al. | 417/368 |

* cited by examiner

*Primary Examiner*—Charles G. Freay
(74) *Attorney, Agent, or Firm*—Birch, Stewart, Kolasch & Birch, LLP

(57) ABSTRACT

A heat-dissipating device is provided for generating primary airflow to dissipate heat generated by external heat sources as well as secondary airflow to dissipate heat generated from the interior of the heat-dissipating device. The heat-dissipating device includes a primary fan and a secondary fan coupled with a shaft of the primary fan. The secondary fan is rotated along the shaft to generate the secondary airflow and dissipate heat generated by the heat-dissipating device per se. Thus, the operation temperature of the heat-dissipating device can be lowered to increase its life span.

20 Claims, 8 Drawing Sheets

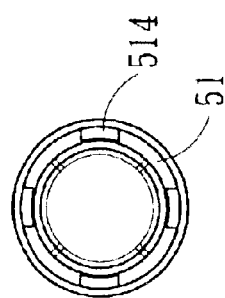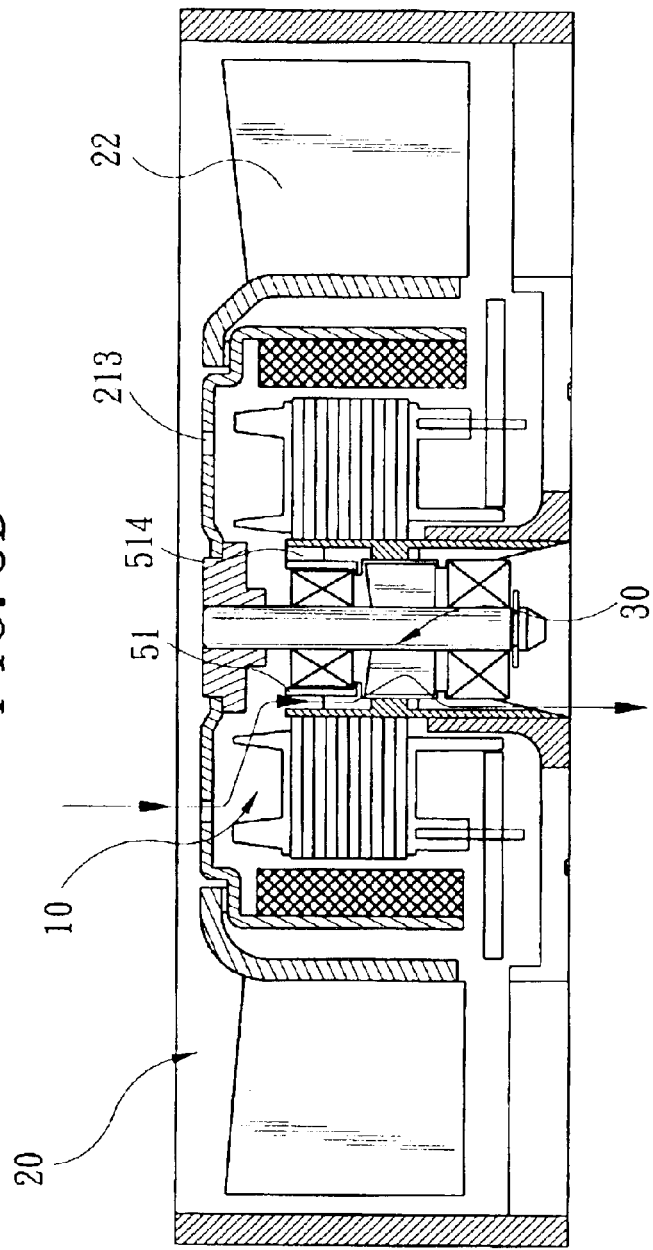
FIG. 5B
FIG. 5A

HEAT-DISSIPATING DEVICE

FIELD OF THE INVENTION

The invention relates to a heat-dissipating device adapted to be used in electronic equipment having a heat source, and particularly to a fan that provides airflow not only to dissipate external heat but also to reduce internal working temperature.

BACKGROUND OF THE INVENTION

Heat dissipation is a problem many electronic devices have to resolve. For instances, in personal computers, notebook computers and the like, overheated environments affect the performance and reliability of these electronic devices. Many machine malfunctions can be traced to heat-dissipating problems.

For example, in a computer system, the mother board has a central processing unit (CPU) for processing data operation. The CPU generates heat during operation and results in increasing temperature. When the temperature reaches a certain level, the CPU overheats and becomes unstable or even breaks down. The CPU is the main heat source of a computer system. To reduce the operation temperature of the CPU, a common practice is to install a heat sink on the CPU and place a fan on the heat sink so that the heat generated from the CPU is transmitted to the heat sink and the fan generates air flow to dissipate heat accumulated in the heat sink. In recent years, to meet the increasing demand of high-speed data processing, the manufacturing and design of CPUs have greatly improved. With improved performance and faster speed, operating voltages and frequencies for CPUs also increase. As a result, the CPU operation temperature becomes much higher. To meet a certain heat-dissipating requirements, it is necessary to enhance the heat-dissipating performance of fans.

Please refer to FIG. 1 showing a conventional fan. The fan 60 consists of a rotor 61 and a stator 62. The stator 62 is disposed in a frame 63 of the fan and telescoped outside a bearing tube 631. The rotor 61 has a shaft 611 and a plurality of blades 612. The blades 612 may generate airflow flowing toward the heat source. There is a pair of bearings disposed in the bearing tube 631 to couple with the shaft 611. When the fan has increased its operational efficiency, operation temperature of the fan also increases (when the fan is energized, permanent magnets in the fan are excited by the stator and the rotor is driven to rotate and generate heat resulting from friction between the bearing and the shaft). The fan operating in high temperature environments tends to have a lower durability. Furthermore, bearings are prone to be damaged when operation temperature exceeds a certain level. Damaged bearings impact fan's operation and also create noise.

Although fans are mainly used to dissipate the heat of external heat sources, they also generate heat and incur high operation temperature themselves under the requirement of high-efficiency operation. This phenomenon affects their useful life. With increasing performance demands of electronic products, this problem becomes more serious.

SUMMARY OF THE INVENTION

The primary object of the invention is to provide a heat-dissipating device that has a self heat-dissipating function.

The heat-dissipating device of the invention includes an electromagnetic element, a primary fan and a secondary fan. The primary fan is coupled with the electromagnetic element. When the electromagnetic element is energized electrically, it generates a magnetic field and a repulsive force to drive the primary fan to rotate. The rotation of the primary fan generates main airflow to dissipate heat generated from external heat sources. The secondary fan is mounted to the shaft of the primary fan and located inside the primary fan. The secondary fan rotates along the primary fan and generates airflow to dissipate heat generated by the heat-dissipating device and to reduce the operation temperature of the heat-dissipating device.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 5A and 5B are schematic views of yet another embodiment of the heat-dissipating device of the invention.

DESCRIPTION OF THE PREFERRED EMBODIMENTS

The invention aims at providing a heat-dissipating device for use in electronic devices to disperse heat from the heat sources of the electronic devices. The electronic devices may be personal computers, notebook computers or other devices. For instance, in personal computers, the heat sources include CPUs and other elements that will generate heat during the operating process and result in an increased operation temperature.

Figure 1:
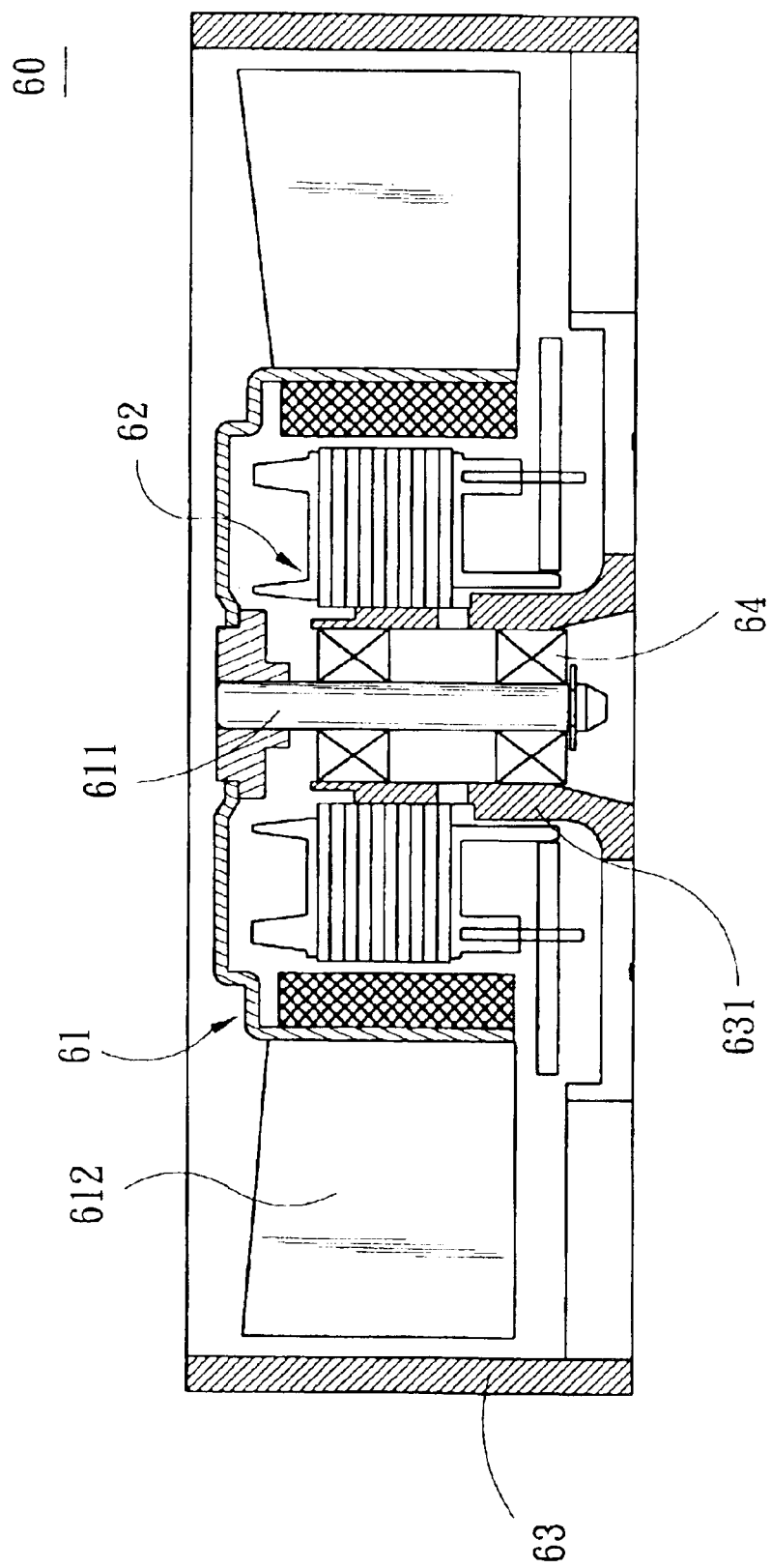
FIG. 1 is a schematic view of a conventional fan.
Figure 2:
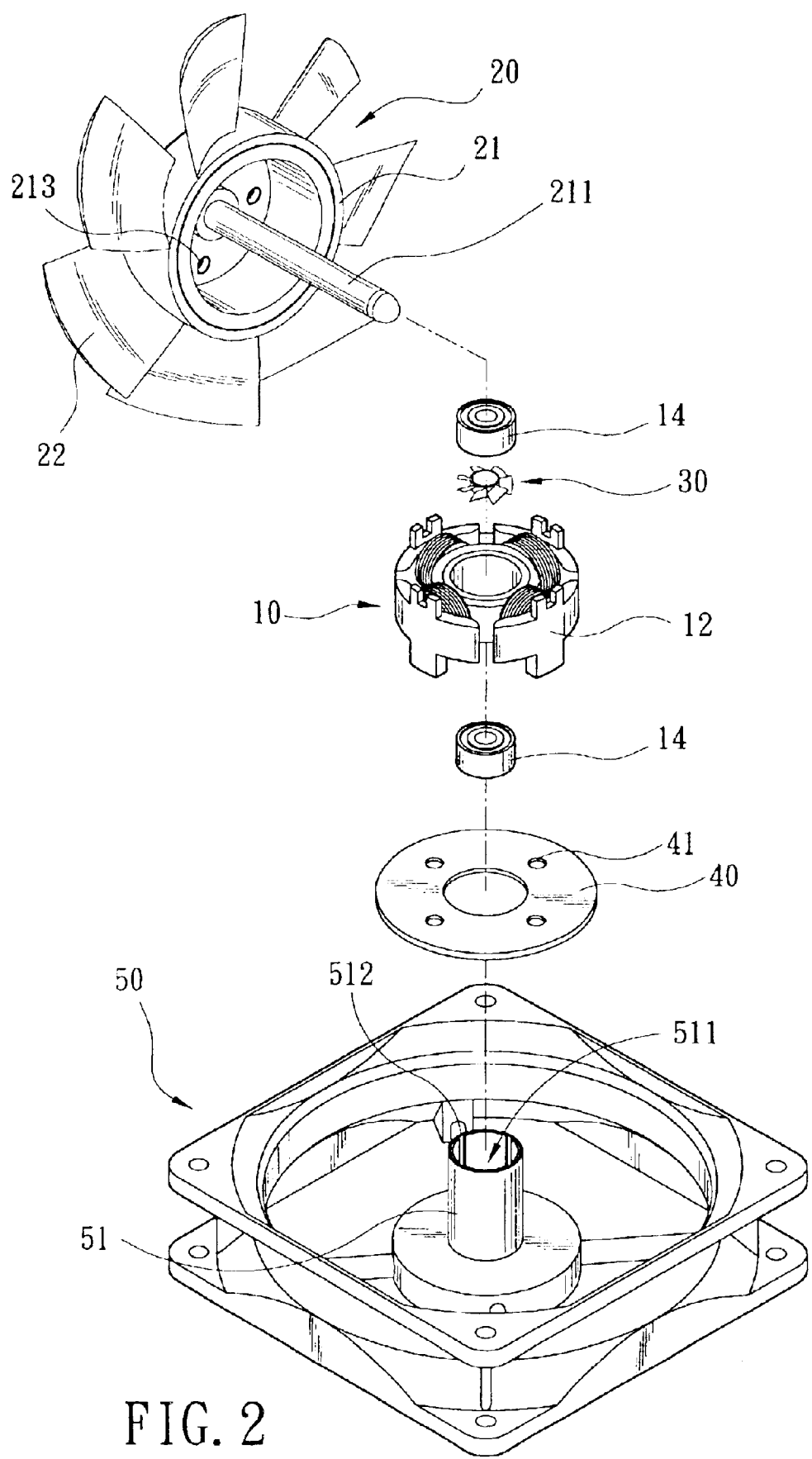
FIG. 2 is an exploded view of a preferred embodiment of the heat-dissipating device of the present invention.
Figure 3A:
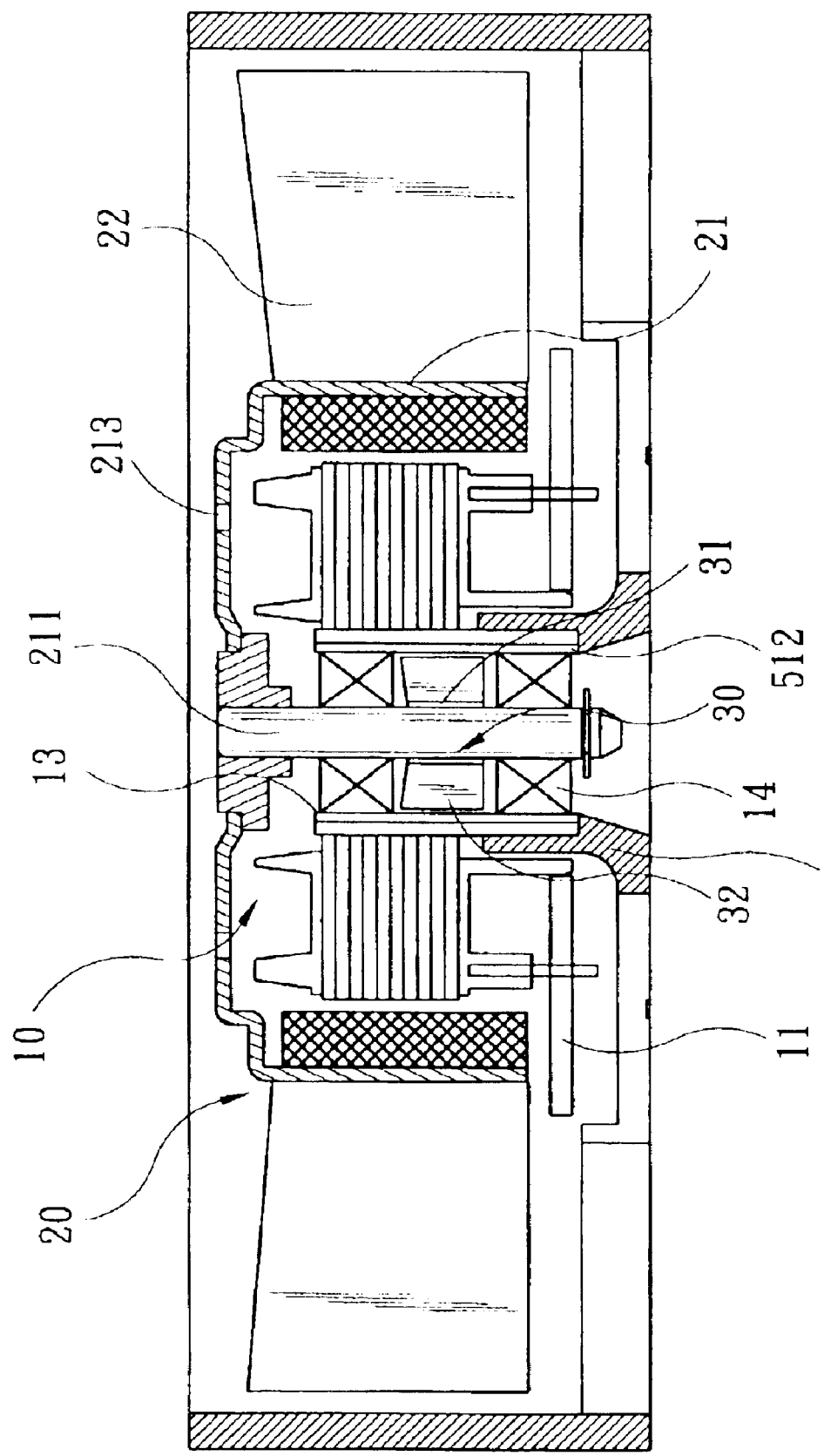
FIGS. 3A and 3B are sectional views the heat-dissipating device shown in FIG. 2.

Please refer to FIGS. 2 and 3A showing the first embodiment of the invention. The heat-dissipating device includes an electromagnetic element 10 (such as a motor), a primary fan 20, a secondary fan 30, a circuit board 40 and a frame 50.

Figure 3B:
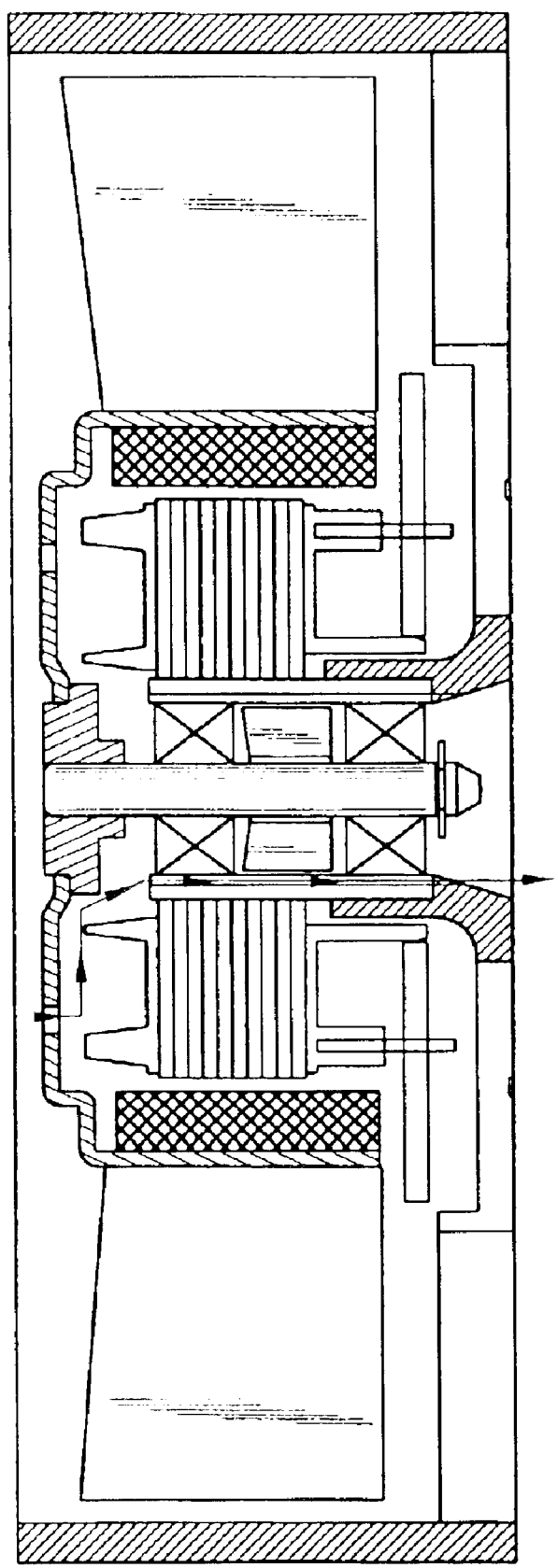

The frame 50 is provided for accommodating the electromagnetic element 10 and the primary fan 20. In addition, the frame 50 further includes a bearing tube 51 in the center thereof. A circuit board 40 and the electromagnetic element 10 are sequentially telescoped on the bearing tube 51. The bearing tube 51 also has a through hole 511 for mounting at least one bearing 14 therein. The peripheral inner surface of the through hole 511 has a plurality of slots 512 formed thereon (as shown in FIG. 2 or FIG. 3). Hence, even the bearing 14 is mounted in the bearing tube 51, airflow can flow in or out through the slots 512 as indicated by arrows shown in FIG. 3B.

The primary fan 20 includes a hub 21 and a plurality of blades 22 mounted around the hub 21. The hub 21 is formed like a cup and has an interior center engaging with a shaft 211. The shaft 211 is coupled in the bearing 14 mounted in the bearing tube 51. When the primary fan 20 rotates, the blades 22 are also driven to rotate and generate the main airflow to dissipate heat generated from external heat sources (such as the CPUs of personal computers). The hub 21 further has a plurality of apertures 213 on the top surface thereof to facilitate airflow to flow into the fan.

The secondary fan 30 includes a sleeve 31 and a plurality of blades 32 mounted around the sleeve 31. The sleeve 31 is telescoped on the shaft 211 of the primary fan 20 and disposed in the through hole 511 of the bearing tube 51. The secondary fan 30 can be rotated along the shaft 211 to generate another airflow in the bearing tube 51 to dissipate heat generated from the interior of the heat-dissipating device.

Please refer to FIGS. 3A and 3B for more description of the invention. The heat-dissipating device of the invention includes a primary fan 20 and a secondary fan 30. The primary fan 20 generates the main airflow to dissipate heat generated by external heat sources. The secondary fan 30 generates another airflow to dissipate heat generated by the heat-dissipating device per se. The primary fan 20 has a top side with apertures 213 formed thereon, and the bearing tube 51 has slots 512. The apertures 213 and the slots 512 form airflow passages to allow low-temperature air to be drawn in from the outside. The airflow can flow through the air passages to dissipate heat accumulated inside the heat-dissipating device. Thus, the heat-dissipating device of the invention can not only dissipate heat generated by external heat sources, but also effectively dissipate heat generated by the heat-dissipating device. Therefore, the life span of the heat-dissipating device can be increased.

Moreover, in the first embodiment, the circuit board 40 can also have a plurality of holes 41 formed thereon to facilitate heat dissipation.

Figure 4A:
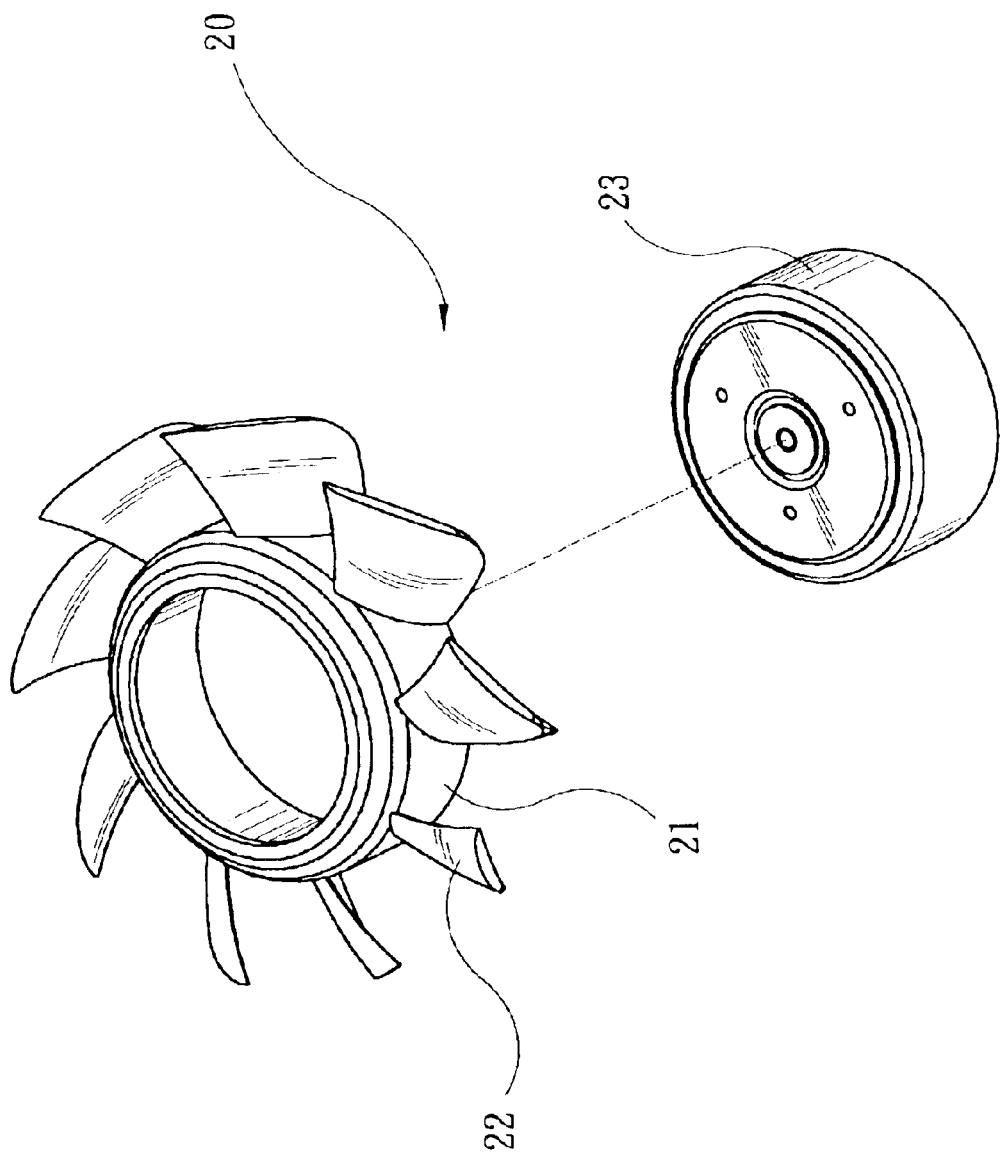
FIGS. 4A–4C are schematic views of another preferred embodiment of the heat-dissipating device of the invention.
Figure 4B:
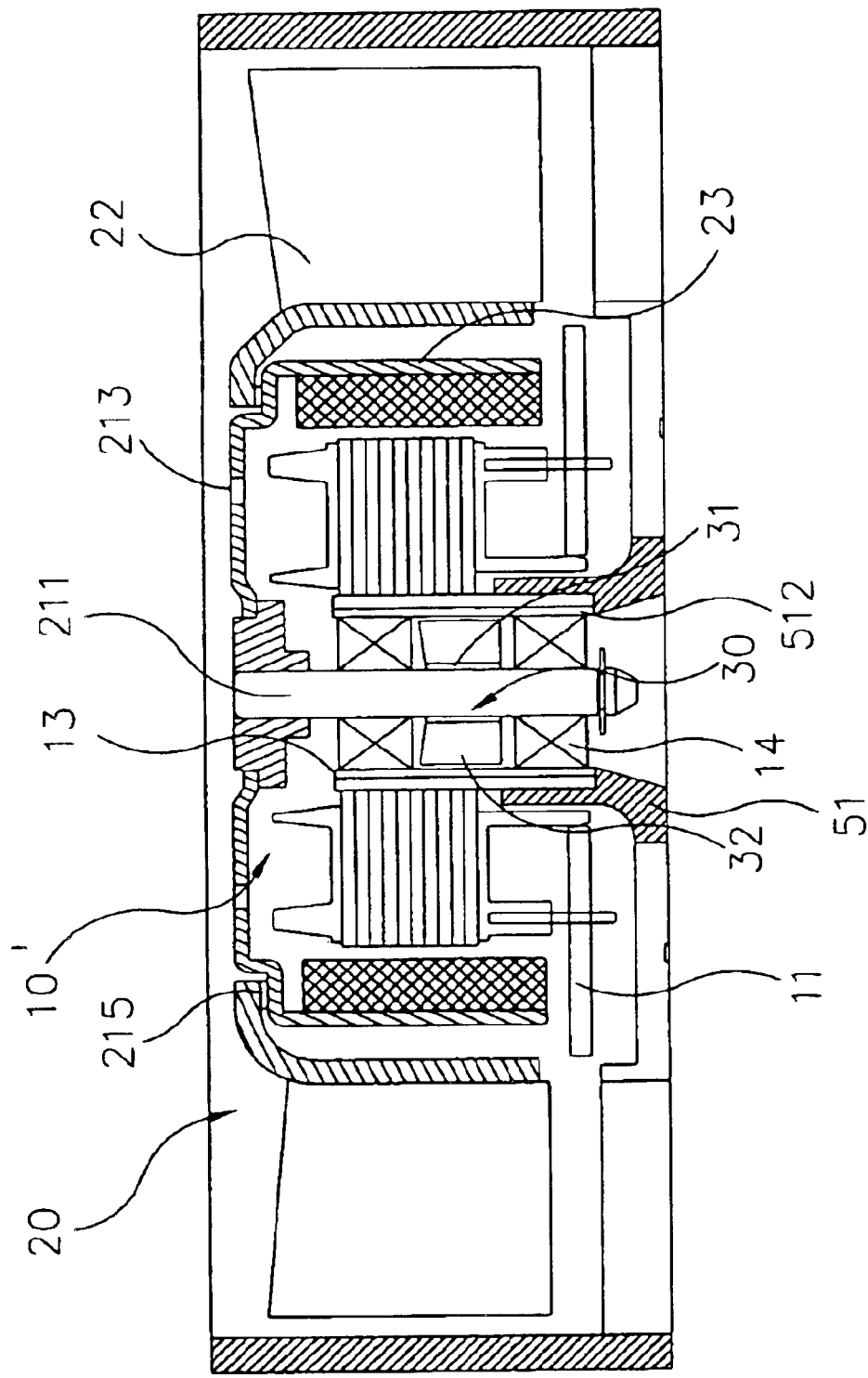
Figure 4C:
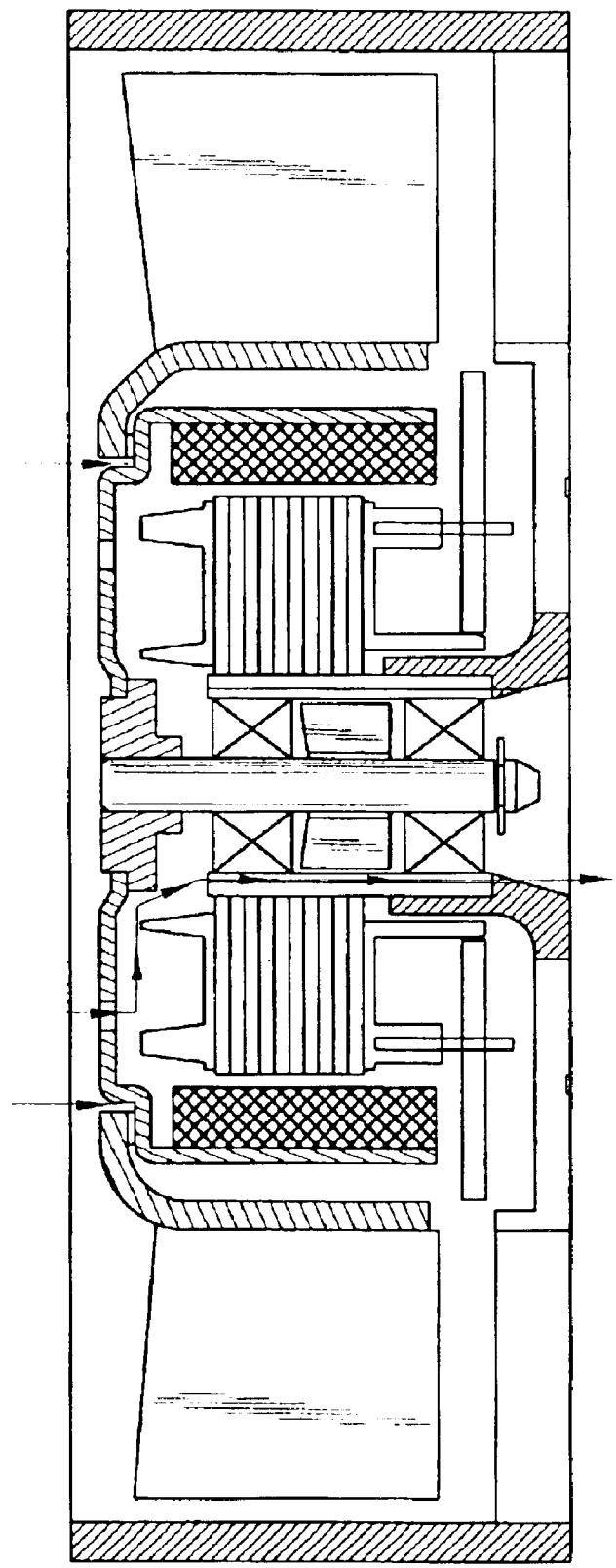

Please refer to FIGS. 4A, 4B and 4C showing another embodiment of the invention. The primary fan 20 includes a hub 21, a shell 23 and a plurality of blades 22 mounted around the hub 21 as shown in FIG. 4A. The hub 21 has a central opening 24 and a plurality of ribs 215 formed on the inner peripheral surface of the top portion thereof. When the hub 21 is telescoped on the shell 23, the ribs 215 are bridged between the hub 21 and the shell 23 to form a gap thereby to create a larger air passage for air intake. The primary fan 20, in addition to drawing air through the apertures on the shell, can also draw more air from the gap mentioned above into the interior of the heat-dissipating device to facilitate heat dissipation and reduce operational temperature as shown in FIG. 4C.

Please refer to FIGS. 5A and 5B showing another embodiment of the heat-dissipating device. The bearing tube 51 has a plurality of slots 514 formed on the peripheral wall thereof. Thus, when the bearing 14 is mounted in the bearing tube 51, external air may be drawn in to flow through the slots 514. The apertures 213 on the top of the primary fan 20 and the slots 514 in the bearing tube 51 may be combined to form air passages to draw external air of a lower temperature into the heat-dissipating device, and dissipate heat generated by the heat-dissipating device.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A heat-dissipating device adapted to be used with a heat source, comprising:
   a frame including a bearing tube for mounting a bearing therein, wherein the bearing tube has a slot formed on a periphery thereof for allowing airflow to pass therethrough;
   a first fan including a hub, a plurality of blades mounted around the hub, and a shaft coupled to the hub and supported by the bearing for generating a main airflow to dissipate heat generated by the heat source; and
   a second fan disposed in the bearing tube and secured on the shaft of the first fan to rotate along with the shaft for dissipating heat generated from the heat-dissipating device.

2. The heat-dissipating device of claim 1, wherein the hub of the first fan has a plurality of apertures formed on a top thereof so as to form an air passage with the slot of the bearing tube.

3. The heat-dissipating device of claim 1 further comprising an electromagnetic element mounted on the bearing and a circuit board electrically connected to the electromagnetic element.

4. The heat-dissipating device of claim 3, wherein the circuit board has a plurality of heat-dissipating holes.

5. The heat-dissipating device of claim 1, wherein the hub further includes a shell telescoped on an inner side of the hub.

6. The heat-dissipating device of claim 5, wherein the hub has a plurality of ribs formed on an inner top surface thereof to form a gap between the hub and the shell for drawing external air into the heat-dissipating device.

7. The heat-dissipating device of claim 5, wherein the shell has a plurality of holes formed on a top thereof for allowing air to flow therethrough and into the interior of the heat-dissipating device.

8. A heat-dissipating device comprising:
   a frame including a bearing tube for receiving at least one bearing therein, wherein the bearing tube has a plurality of slots formed on a periphery thereof for allowing airflow to pass therethrough;
   a primary fan including a hub, a plurality of blades arranged around the hub, and a shaft coupled to the hub and supported by the bearing; and
   a secondary fan disposed in the bearing tube and secure on the shaft to rotate along the shaft;
   wherein the primary and secondary fans generate airflow to respectively dissipate heat generated from exterior and interior of the heat-dissipating device.

9. The heat-dissipating device of claim 8, wherein the hub of the first fan has a plurality of apertures formed on a top thereof so as to form an air passage with the slot of the bearing tube.

10. The heat-dissipating device of claim 8 further comprising an electromagnetic element mounted on the bearing and a circuit board electrically connected to the electromagnetic element.

11. The heat-dissipating device of claim 10, wherein the circuit board has a plurality of heat-dissipating holes.

12. The heat-dissipating device of claim 8, wherein the hub further includes a shell telescoped on an inner side of the hub.

13. The heat-dissipating device of claim 12, wherein the hub has a plurality of ribs formed on an inner top surface thereof to form a gap between the hub and the shell for drawing external air into the heat-dissipating device.

14. The heat-dissipating device of claim 12, wherein the shell has a plurality of holes formed on a top thereof for allowing air to flow therethrough and into the interior of the heat-dissipating device.

15. A heat-dissipating device comprising:
   a frame including a tube having a slot formed on a periphery thereof;
   a primary fan including a hub, a plurality of blades arranged around the hub, and a shaft coupled to the hub, wherein the hub has a plurality of apertures formed on a surface thereof so as to form an air passage with the slot; and a secondary fan disposed in the tube and secured on the shaft to rotate along the shaft;

wherein the primary and secondary fans generate airflow to respectively dissipate heat generated from exterior and interior of the heat-dissipating device.

16. The heat-dissipating device of claim 15 further comprising an electromagnetic element mounted on the bearing and a circuit board electrically connected to the electromagnetic element.

17. The heat-dissipating device of claim 16, wherein the circuit board has a plurality of heat-dissipating holes.

18. The heat-dissipating device of claim 15, wherein the hub further includes a shell telescoped on an inner side of the hub.

19. The heat-dissipating device of claim 18, wherein the hub has a plurality of ribs formed on an inner top surface thereof to form a gap between the hub and the shell for drawing external air into the heat-dissipating device.

20. The heat-dissipating device of claim 18, wherein the shell has a plurality of holes formed on a top thereof for allowing air to flow therethrough and into the interior of the heat-dissipating device.

* * * * *